Sept. 30, 1930.  W. L. McLAUGHLIN  1,776,838
DETECTOR FOR MISFIRING
Filed Sept. 24, 1928
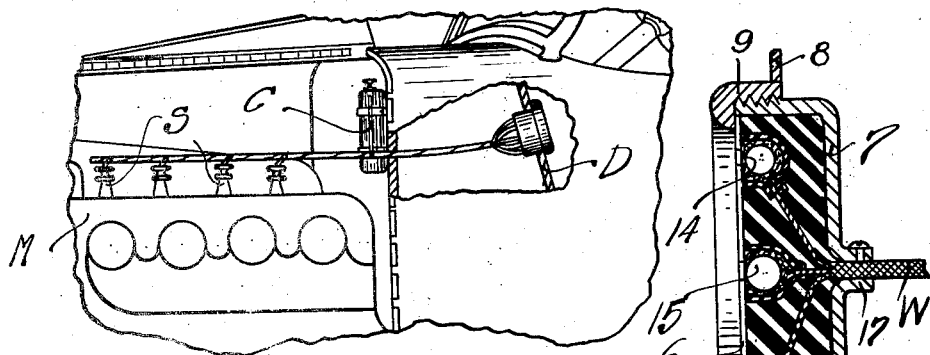
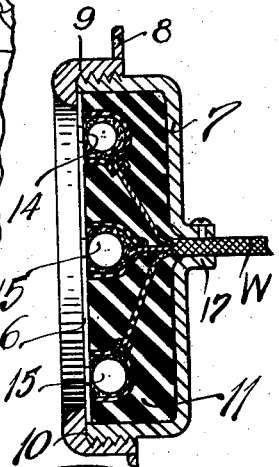
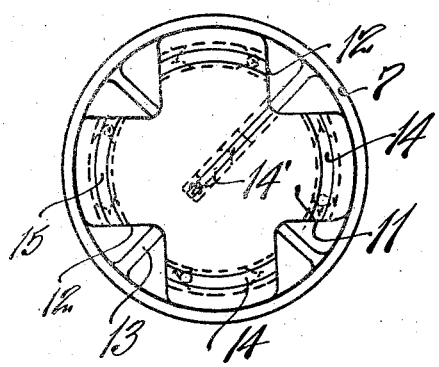
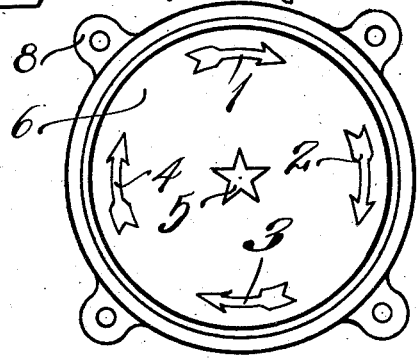
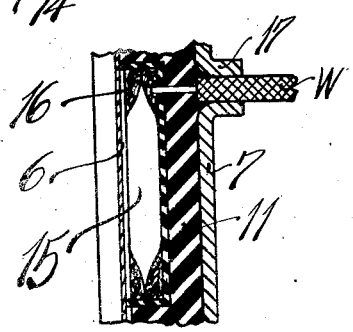
Inventor
William L. McLaughlin
By Herbert E. Smith
Attorney Patented Sept. 30, 1930

1,776,838

UNITED STATES PATENT OFFICE

WILLIAM L. McLAUGHLIN, OF SEATTLE, WASHINGTON

DETECTOR FOR MISFIRING

Application filed September 24, 1928. Serial No. 307,884.

My present invention relates to improvements in detectors for misfiring of spark plugs, in an internal combustion engine.

The primary object of the invention is the provision of means whereby improper ignition of the cylinders of the engine may be detected by the use of an indicator or detector in combination with the spark plug. The invention contemplates the use of an indicator located in position where it is readily visible to the driver of an automobile and electrically connected with the spark plugs of the engine. Means are provided on the detector or indicator whereby the successive explosions in the cylinders are illustrated by a flash. On the indicator by the utilization of the device of my invention the ignition system of the engine may be tested and the voltage of the electric currents is indicated in order that the driver of an automobile may be acquainted with the conditions existing in the ignition system.

My invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have so far devised for the practical application of the principles of my invention.

Figure 1 is a view showing as much of an automobile and its motor and connections as is necessary to illustrate the installation of the device of my invention. Figure 2 is an enlarged detail transverse vertical sectional view of the detector. Figure 3 is a plan view of the detector with the screw cap removed. Figure 4 is a plan view of the detector. Figure 5 is an enlarged detail sectional view showing one of the neon gas tubes utilized for illuminating the dial or face of the detector.

In order that the general arrangement and relation of parts may readily be understood I have shown in Figure 1 a conventional motor M having four spark plugs S and the ignition system includes wires W from the spark plugs that extend through a condenser C, which performs its usual functions, to the detector which as shown is mounted upon the dashboard D of the automobile.

The detector is mounted upon the dashboard and is provided with a series of markers or arrows 1, 2, 3, 4, and a star 5. The arrows are disposed in circular arrangement about the central star 5 and these insignias are fashioned as slots in the face plate 6 or dial of the detector. The dial or face plate is of opaque material and the arrows are illuminated with the successive firings or explosions in the four cylinders of the engine. The number of arrows is determined by the number of spark plugs, and the star 5 is illuminated from the ignition circuit by proper connections, as a pilot light. In this manner the detector displays successively the firing of the cylinders, and of course if a cylinder misses fire the arrow is not illuminated. Upon detection of a mis-fire in the cylinders the automobile driver may of course remedy the trouble.

The detector includes a cup 7 having lugs 8 by means of which it is attached to the dashboard D, and a screw cap 9 in the shape of a ring is threaded onto the cup 7. The ring or screw cap has a retaining flange 10 which fits over the dial or face plate 6 and holds it in position. Within the cup is mounted a cruciform insulator 11 which may be bakelite or other suitable material. The insulating block 11 is provided with angular notches 12 in its edge and these notches co-act with the radial, centering lugs 13 that project inwardly from the rim of the cup into said notches. By this means the insulating block 11 is centered and retained in the cup, and the cap ring 9 holds the parts in place.

The insulating block is provided with a series of arcuate grooves 14 in its face, the grooves being provided with open ends, and the block also has a central groove 14'. Within these grooves are secured complementary tubes 15 preferably of glass and filled with neon gas. It will be understood that when the gas is charged with an electric current or when the current passes through the gas in the tube, the tube is illuminated, and as the tubes are located behind the arrows and star of the dial, it will be obvious that the current of electricity passing through the gas in the tubes will illuminate the detector signals of the dial or face plate. The neon tube is normally illuminated with a color, as pink, light, and the depth of the color indicates the voltage of the current of electricity passing therethrough. If a spark plug is mis-firing, the current of course does not pass through the gas tube, and the arrow is not illuminated.

The wires W are connected to the ends of the gas tubes by the employment of steel wool packing 16 which packing forms a conductor for the electric current and the wires from the condensers and spark plugs are brought to the detector through a hollow boss in the back of the cup 7 as indicated at 17.

Having thus fully described my invention, what I claim as new and desire to secure by Letters Patent is:

1. The combination in a detector with a cup having an insulating block therein and co-acting retaining means on the cup and block, of a plurality of gas tubes mounted in said block and electrical wires connected to said tubes, a dial having slots complementary to said tubes, and a screw cap for the cup having means for retaining said dial.

2. The combination in a detector with a cup and an insulating block therein, of radial lugs on said cup engaging notches in the block, said block having arcuate grooves and neon gas tubes in said grooves, electrical connections to said tubes and dial having slots corresponding to said tubes, a screw cap for the cup and a retaining ring on said cap.

In testimony whereof I affix my signature.

WILLIAM L. McLAUGHLIN.